United States Patent
Ungureanu (10) Patent No.: US 12,388,859 B2
(45) Date of Patent: Aug. 12, 2025

(54) RISK-BASED VULNERABILITY MANAGEMENT

(71) Applicant: McKesson Corporation, Irving, TX (US)

(72) Inventor: Adrian Ungureanu, Austin, TX (US)

(73) Assignee: McKesson Corporation, Irving, TX (US)

( * ) Notice: Subject to any disclaimer, the term of this patent is extended or adjusted under 35 U.S.C. 154(b) by 299 days.

(21) Appl. No.: 17/978,382

(22) Filed: Nov. 1, 2022

(65) Prior Publication Data

US 2024/0146755 A1    May 2, 2024

(51) Int. Cl.
*H04L 9/40* (2022.01)
*H04L 41/14* (2022.01)

(52) U.S. Cl.
CPC ........ *H04L 63/1433* (2013.01); *H04L 41/145* (2013.01); *H04L 63/1416* (2013.01)

(58) Field of Classification Search
CPC ............... H04L 63/1433; H04L 41/145; H04L 63/1416; H04L 41/12
See application file for complete search history.

(56) References Cited

U.S. PATENT DOCUMENTS

| | | | | |
|---|---|---|---|---|
| 7,904,962 B1* | 3/2011 | Jajodia | ................ | H04L 63/1425 709/224 |
| 7,979,368 B2* | 7/2011 | Kapoor | ................... | H04L 63/14 706/45 |
| 8,442,940 B1* | 5/2013 | Faletti | ..................... | G06F 40/30 707/610 |
| 11,277,432 B2* | 3/2022 | Hassanzadeh | ........ | G06F 21/577 |
| 2011/0214157 A1* | 9/2011 | Korsunsky | .......... | H04L 63/1458 726/1 |
| 2022/0191230 A1* | 6/2022 | Morgan | .................. | H04L 63/20 |

OTHER PUBLICATIONS

"Kenna Security", [Online]. Retrieved from the Internet: https: www.cisco.com c en us products security kenna-is-part-of-cisco. html, 5 pgs.

"Tenable Vulnerability Management", [Online]. Retrieved from the Internet: https: www.tenable.com products tenable-io, 16 pgs.

(Continued)

*Primary Examiner* — Sm A Rahman
(74) *Attorney, Agent, or Firm* — Schwegman Lundberg & Woessner, P.A.

(57) ABSTRACT

Various systems and methods for providing risk-based vulnerability management are described herein. A system is configured to access an attack graph, the attack graph including exploits represented as preconditions and postconditions; access vulnerability information of a plurality of nodes in the network, the vulnerability information including conditions of the plurality of nodes in the network; access a network connectivity graph that represents a logical network topology of the plurality of nodes in the network; identify a set of attack paths in the attack graph by comparing the conditions of the plurality of nodes in the network with preconditions and postconditions in the attack graph; calculate a risk score for each of the set of attack paths in the attack graph; and present the risk score for each of the set of attack paths.

22 Claims, 8 Drawing Sheets

(56) References Cited

OTHER PUBLICATIONS

Ammann, Paul, "Scalable Graph Based Network Vulnerability Analysis", CCS 02 Nov. 18 22 2002 Washington DC USACopyright 2002 ACM 1 58113 385 5010011, (Nov. 2002), 8 pgs.

Bach, Nguyen, "A Review of Relation Extraction", Literature review for Language and Statistics, (2007), 15 pgs.

Barik, Mridul Sankar, "Attack Graph Generation and Analysis Techniques", Defense Science Journal, vol. 66, No. 6, (Nov. 2016), 9 pgs.

Gonzalez-Munoz, Luis, "Bayesian Attack Graphs for Security Risk Assessment", Workshop on Cyber Resilience, (2016), 5 pgs.

Jajodia, Sushil, "Topological Analysis of Network Attack Vulnerability", Managing Cyber Threats, (2005), 20 pgs.

Jhawar, Ravi, "Attack Trees With Sequential Conjunction", IFIP Advances in Information and Communication Technology, (Mar. 8, 2015), 20 pgs.

Kordy, Barbara, "DAG Based Attack and Defense Modeling Dont Miss the Forest for the Attack Trees", Computer Science Review vol. 13 14, (Nov. 2014), 57 pgs.

Lippmann, Richard Paul, "An Annotated Review of Past Papers On Attack Graphs", Lincoln Library, (Mar. 31, 2005), 39 pgs.

Martinez-Rodriguez, Jose L., "Information Extraction meets the Semantic Web: A Survey", IOS Press Content Library, (Feb. 5, 2020), 83 pgs.

Noel, Steven, "Advances in Topological Vulnerability Analysis", (Mar. 2009), 6 pgs.

Phillips, Cynthia, "A Graph-Based System for Network-Vulnerability Analysis", Proceedings of the 1998 workshop on New security paradigms, (1998), 9 pgs.

Schiele, Nathan Daniel, "A Novel Approach for Attack Tree to Attack Graph Transformation: Extended Version", arXiv:2110.02553, (Oct. 6, 2021), 20 pgs.

Tiberiu-Marian, Georgescu, "Natural Language Processing Model for Automatic Analysis of Cybersecurity-Related Documents", Symmetry, (Mar. 2, 2020), 19 pgs.

"Lecture 17", [Online]. Retrieved from the Internet: <https://web.stanford.edu/class/archive/cs/cs161/cs161.1176/Slides/Lecture17.pdf>, 80 pgs.

Chockalingam, Sabarathinam, et al., "Bayesian Network Models in Cyber Security: A Systematic Review", Proceedings of the Nordic Conference on Secure IT Systems, (2017), 18 pgs.

Fenton, Norman, et al., "Risk assessment and decision analysis with Bayesian networks", CRC Press, (2011), 44 pgs.

Liu, Yu, et al., "Network vulnerability assessment using Bayesian networks", Society of Photo-Optical Instrumentation Engineers (SPIE), (2005), 12 pgs.

Su, Jessica, "Lecture 16", [Online]. Retrieved from the Internet: <https://web.stanford.edu/class/archive/cs/cs161/cs161.1168/lecture16.pdf>, 9 pgs.

* cited by examiner

EXPLOIT: VICTIM'S FILES COPIED TO ATTACKER HOST

AND 1. RCP AVAILABLE ON ATTACKING HOST
  OR 1. ATTACKER INSTALLS RCP
     2. ATTACKER CHANGES EXEC PRIVILEGES FOR RCP
  2. SHELL ACCESS ON ATTACKING HOST
  OR 1. MONITOR COMMUNICATIONS TO OBTAIN SHELL PASSWORD
     2. PHYSICAL ACCESS AND OBSERVE LOGIN
     3. PLANT SPY AS TRUSTED INSIDER
  3. CONNECTIVITY TO VICTIM HOST
  OR 1. GAIN ACCESS WITH DIRECT NETWORK CONNECTION
     2. GAIN ACCESS WITH USING PUBLIC TELEPHONE NETWORK

RISK-BASED VULNERABILITY MANAGEMENT

TECHNICAL FIELD

Embodiments described herein generally relate to network monitoring, and in particular, to a system that provides risk-based vulnerability management.

BACKGROUND

Risk-based Vulnerability Management is a process that reduces vulnerability across an attack surface by prioritizing remediation based on the risks they pose on the organization. Attack graphs are a powerful framework to represent prior knowledge about vulnerabilities and network connectivity. An attack graph is a representation of all paths through a system that terminate in a state where the attacker has achieved a goal. Due to the multiplicity of paths in an attack graph, Bayesian Networks may be used to help model the probability of paths through an attack graph.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide for generating an attack graph for risk-based vulnerability management. Although there are various approaches to generating attack graphs, each has their own set of weaknesses and disadvantages.

One approach uses state enumeration to automate attack graph generation. This is based on either custom algorithms or model checking techniques. Nodes in an attack graph represent the possible system states during execution of an attack. A system state comprises of information on host(s), user access levels, and effects of the attack in progress. Edges represent a change of state, caused by a single action of the attacker, and may be weighted based on the attacker's effort required or the time to succeed. Based on this approach, algorithms based on model checking techniques have been proposed for generation and analysis. Performance analysis for 4 hosts with 8 attacks resulted in attack graph of 5948 nodes and 68364 edges, and needed 2 hours to generate, thus making such an approach infeasible for applying on networks of moderate size.

Another approach is based on threat vulnerability analysis (TVA) and adopts a topological approach to network vulnerability analysis. It assumes that preconditions of an attack are never invalidated by successful execution of another attack. The assumption and approach were able to reduce the complexity of generating attack paths from exponential to polynomial. However, TVA requires an extensive knowledge base of known vulnerabilities and attack techniques, which are difficult to generate due to unstructured and semi-structured nature of vulnerabilities reported.

Another approach is called the logic programming approach (LPA) and uses a representation of attack graph known as logical attack graph (LAG), which shows logical dependencies among attack goals and configuration information. However, a requirement of LAG is that attacker potential privilege should be explicitly expressed as part of the formalism. For such an approach to be applied, software vulnerability advisories, configuration and network topology information are required to be encoded for the generation algorithm. Empirical results show that best case complexity is $O(N^2)$ and worst case is $O(N^3)$ for generating attacks and the method has been proven to scale to 1,000-10,000 host machines.

Another approach is network security planning architecture (NetSPA) and is based on a representation of an attack graph and method that scales roughly as $O(n*\log(n))$. Experimental results indicate that the method can scale up to 50,000 hosts.

These approaches and others that are used to generate attack graphs encounter similar challenges. These challenges include the difficulty of capturing the input information, lack of scalability, and lack of usability of attack graphs by non-technical personnel.

For evaluating risk, it is important to analyze security of an enterprise network and to consider multi-stage, multi-host attacks. A determined attacker will not stop at a first compromise but can be expected to penetrate deeper by jumping from one machine to another. For this reason, configuration of network machines and evaluation for remediation of vulnerabilities is a hard task for human beings. Thus, it is important to design a tool to find potential security priorities and prioritize the effort to remediate.

The present systems and methods described herein address these limitations and challenges. This improved approach is different from industry solutions through the process of capturing and generating attack paths, and through the risk evaluation of vulnerabilities, taking into consideration the prior exploits via an attack path. The objective is to combine threat and exploit intelligence feeds, managed vulnerabilities, global attack telemetry, and remediation intelligence to accurately track and measure probability of exploiting attack paths across the enterprise's global attack surface.

The present systems and methods use advances in natural language processing (NLP) to identify input information, pre- and post-conditions, and to enable generation of attack graphs. Attack graphs are generated using information from public databases, such as open-source intelligence (OSINT) databases. To improve accessibility and usability, graph database technology is used to store attack graphs in a graph structure. These functions and others are described in more detail below.

Figure 1:
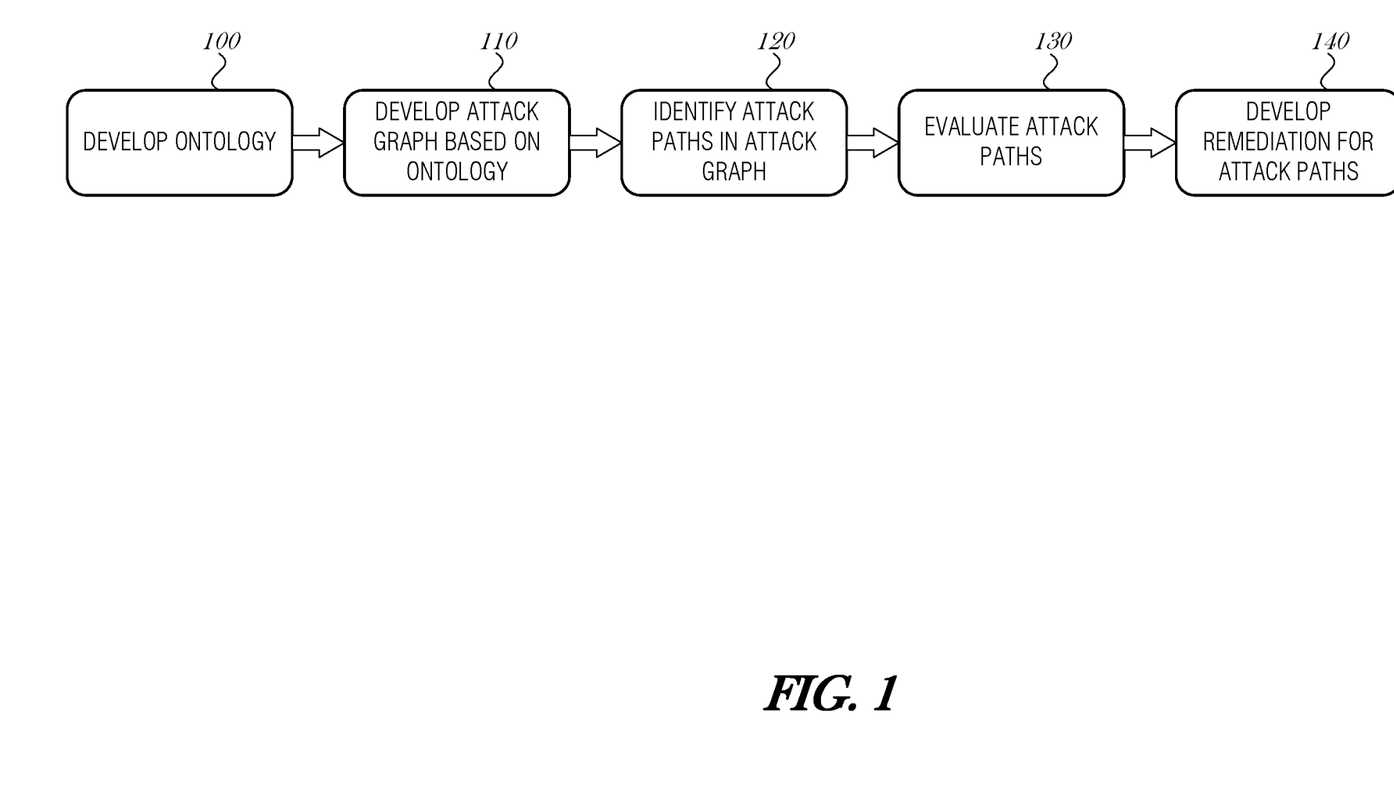
FIG. 1 is a block diagram illustrating the phases of developing an attack graph, according to an embodiment.

FIG. 1 is a block diagram illustrating the phases of developing an attack graph, according to an embodiment. An ontology is developed in stage 100, the ontology is then used to in stage 110 to develop an attack graph. In stage 120, attack paths in the attack graph are identified using data mining. In stage 130, the attack paths are evaluated to determine the risk of exploitation of the paths. Based on the evaluated risks, a remediation strategy is developed in stage 140.

Figure 2:
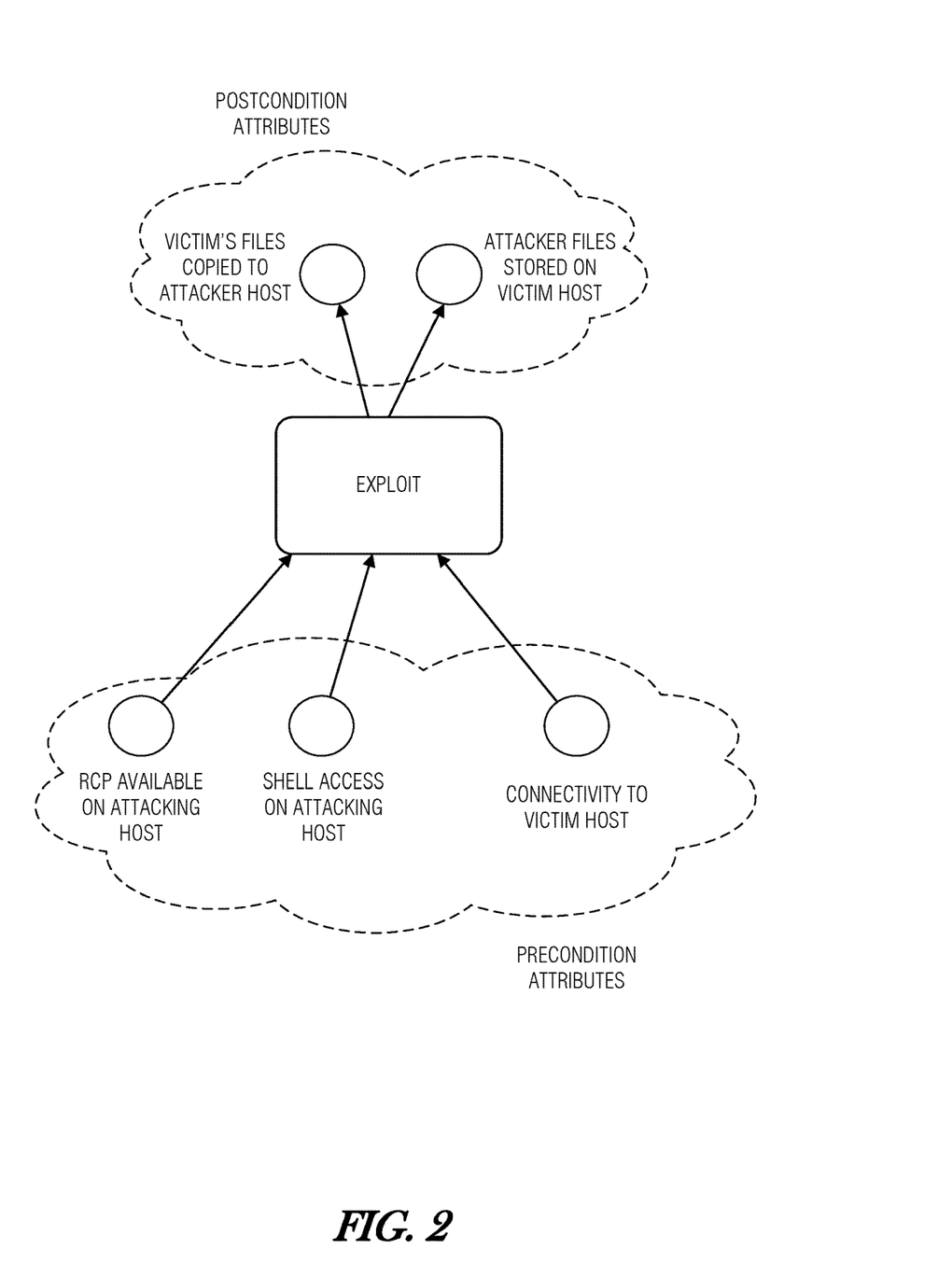
FIG. 2 is a diagram illustrating an exploit, according to an embodiment.

In stage 100, an ontology is developed. An ontology is used to express entities, attributes, relationships, and properties of a knowledge domain. The ontology used in the present system is a custom domain ontology that identifies the relationships between vulnerabilities, attack privilege, and network connectivity. A vulnerability is a fact or state of a system that either enables an exploit or is the result of an exploit. An example vulnerability is "shell access on attacker." This vulnerability may be the goal of an exploit or a precursor to an exploit. An attack privilege is a privilege level of an attacker, such as the attacker having execute privileges, copy privileges, shell access, or the like. A network connectivity is a fact about the connectivity of two or more hosts. The network connectivity attribute may be a requirement for an exploit. An exploit may then be expressed as a set of preconditions to enable the exploit, the exploit, and a set of postconditions, where the preconditions and postconditions may include one or more vulnerability attributes, attack privilege attributes, or network connectivity attributes. FIG. 2 is a diagram illustrating an exploit 200, according to an embodiment.

To develop an ontology, tokens (e.g., words, terms, or phrases) are collected and curated to create one or more dictionaries. Such data may be collected from humans, such as system designers, cybersecurity analysts, network administrators, or the like. Data may also be collected from electronic resources, such as online articles, common vulnerabilities and exposures (CVE) databases, or the like. The data is parsed to extract tokens of attributes. These are stored in a dictionary and may be grouped into categories. Categories of attributes are specific to implementation described here and express vulnerabilities, attack privilege, and network connectivity.

An ontology may be modeled using various tools, such as Protégé by the Center for Bio-Informatics Research at Stanford University, NeOn Toolkit, SWOOP, OWLGrEd, etc. The tools allow for an ontology designer to organize, arrange, and define ontologies. The ontology may be saved in various formats, such as W3C's Web Ontology Language (OWL), RDF (Resource Description Framework), RDFS (RDF Schema), etc. OWL is a Semantic Web language designed to represent rich and complex knowledge about things, groups of things, and relations between things. RDF expresses relationships as triplets of [subject, predicate, object]. RDFS is a schema language for RDF and allows for the expression of constraints on relationships, instances of classes, and other extensions of RDF. Other types of modeling tools may be used, such as directed acyclic graph (DAG) based tools. In the knowledge domain of risk management, ontologies are used to model potential exploits or vulnerabilities in a system.

The ontology may be developed using human intervention, or the ontology may be completely developed using a machine. The resultant ontology is used in the next stage 110, to generate an attack graph.

In stage 110, the ontology is used to generate an attack graph. An ontology-based information extraction (OBIE) system is used to extract information from data sources and develop the attack graph. The OBIE system includes two machine-learning models that classify tokens and determine relationships between the tokens, using the resultant ontology from the previous stage. These models include a Named Entity Recognition (NER) model and a Relation Extraction (RE) model.

The NER and RE models may be trained using annotated training data. Annotations may be performed manually by analysts, penetration testers, etc. After the NER and RE models are sufficiently trained, the NER and RE models may be used to automate annotation of additional training data. The models may be reviewed and tested to ensure that the models' performance are accurate. The models may be trained using supervised or unsupervised learning techniques. Training data may include data from vulnerability data sources, such the National Vulnerability Database (NVD), provided by the National Institute of Standards and Technologies (NIST), or the Open Source Intelligence (OS-INT) database.

Figure 3:
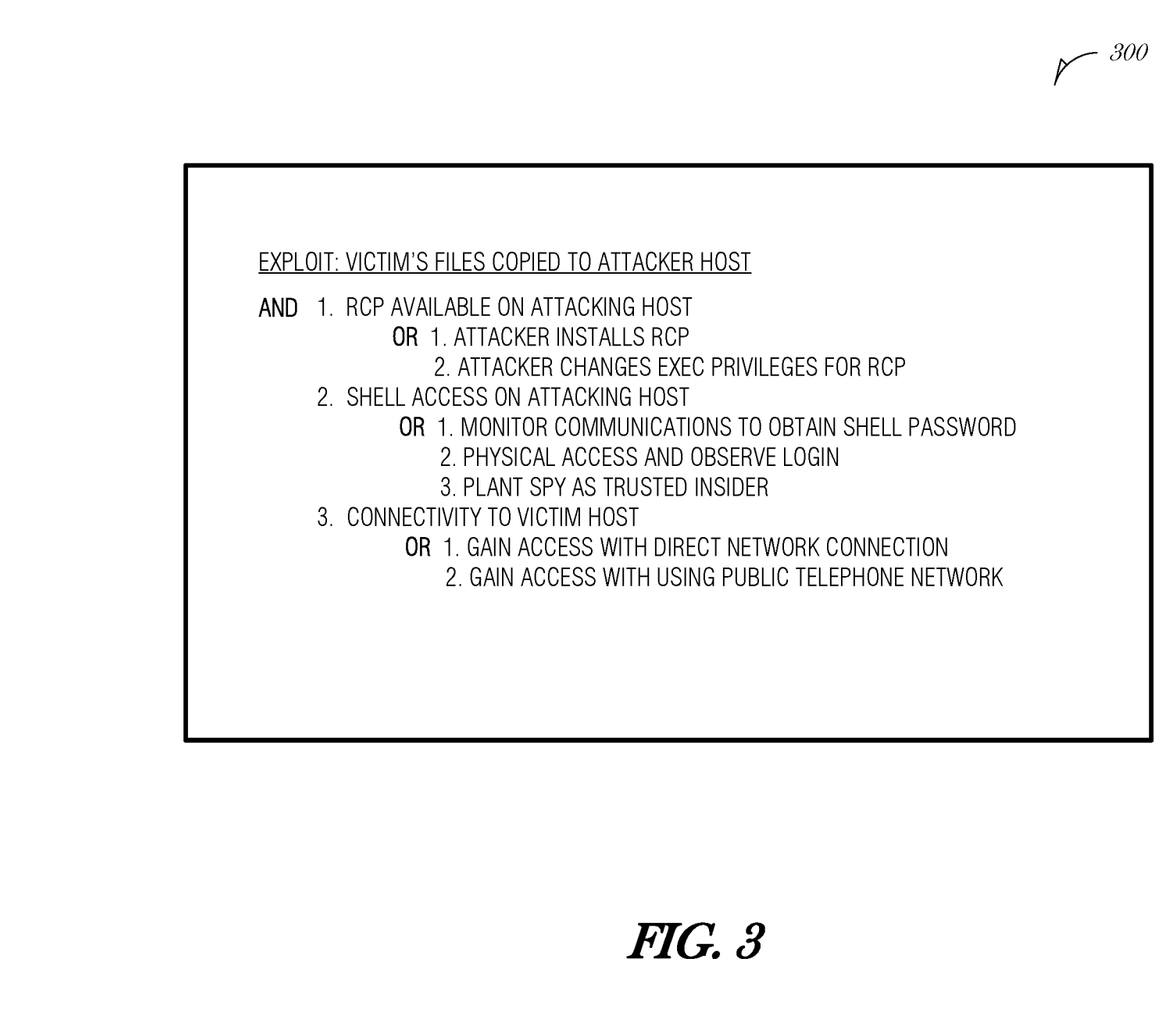
FIG. 3 is a listing illustrating an example attack tree, according to an embodiment.

In an implementation, training data is extracted from OSINT databases, such as the NVD. The training data may be extracted using the ontology developed in the stage 110 to identify the key information about vulnerabilities, attack privilege, and network connectivity. The extracted attributes will be used to construct a data structure called an Attack Graph (AG). An AG is defined with the goal or objective of an attacker as the root node, then with sub-goals, sub-sub-goals, etc., as leaf or intermediary nodes. The deconstruction of a goal to sub-goals and sub-sub-goals can be performed recursively until the sub-goals represent basic actions. Basic actions correspond to atomic components. FIG. 3 is a listing illustrating an example attack tree (AT) 300, according to an embodiment. The nodes of an AT are useful and may represent preconditions or postconditions of an exploit. The AT can be translated to an AG using a mathematical procedure.

Other data structures may be used to extract training data. For instance, while the data may be extracted using an attack tree structure, data may also be extracted in JSON (JavaScript Object Notation) or STIX™ (Structured Threat Information Expression).

Once trained, the NER and RE models are used by the OBIE system. The OBIE system accesses one or more data sources that describe vulnerabilities, threats, or exploits. These data sources may include, but are not limited to OSINT databases, the MITRE ATT&CK® knowledge base, the NVD, or data sources provided by the Cybersecurity & Infrastructure Security Agency. Tokens may be extracted from these data sources using an AT data structure, JSON, STIX, or another format. Using the resultant ontology from the previous stage, the NER model is able to classify tokens as vulnerability attributes, attack privilege attributes, or network connectivity attributes. The RE model is used to identify relationships between tokens. The RE phase includes verbs to describe the Privilege of an Attacker. For example, 'attacker requires privilege to exploit misconfiguration and gains privilege', where: non-bold words represent categories extracted from NER, that contain words, e.g. privilege=local user, and bold words represent relationships between words, which provide information about the sequence. Here, the term "requires" is a precondition and "gains" is a postcondition. By combining the pre- and postconditions, a process is used to construct the Attack Path.

The result is an attack graph of nodes. This attack graph is stored in a graph database for use in the next stage.

In stage 120, attack paths are identified. To determine attack paths, three pieces of information are used: the attack graph, a vulnerability database, and a network connectivity graph. The attack graph is generated in the previous stage and includes all of the possible exploits with their privilege-based preconditions and postconditions, and relationships. The vulnerability database is a used to track and store information about the network under test. Scanning tools, local agents, or other mechanisms may be used to obtain configuration settings, states of, and facts of hosts, network appliances, and other components of the network under test. This data is stored in the vulnerability database. Network analysis and monitoring tools may be used to obtain vulnerability information. Systems such as Veracode, Prisma Cloud by Palo Alto Networks, or Rapid7 may be used to monitor software, hardware, network activity, and other aspects of a network under test to determine potential vulnerabilities.

The network connectivity graph represents the hosts, network appliances, and other components of the network and their interconnectivity. The network connectivity graph may be constructed using network logs, network discovery utilities, centralized network management tools, or the like.

By analyzing the attack graph in view of the state of the network under test, as represented by the vulnerability database and the network connectivity graph, various possible attack paths may be determined. An attack path is a sequence of one or more exploits resulting in a goal.

Figure 4:
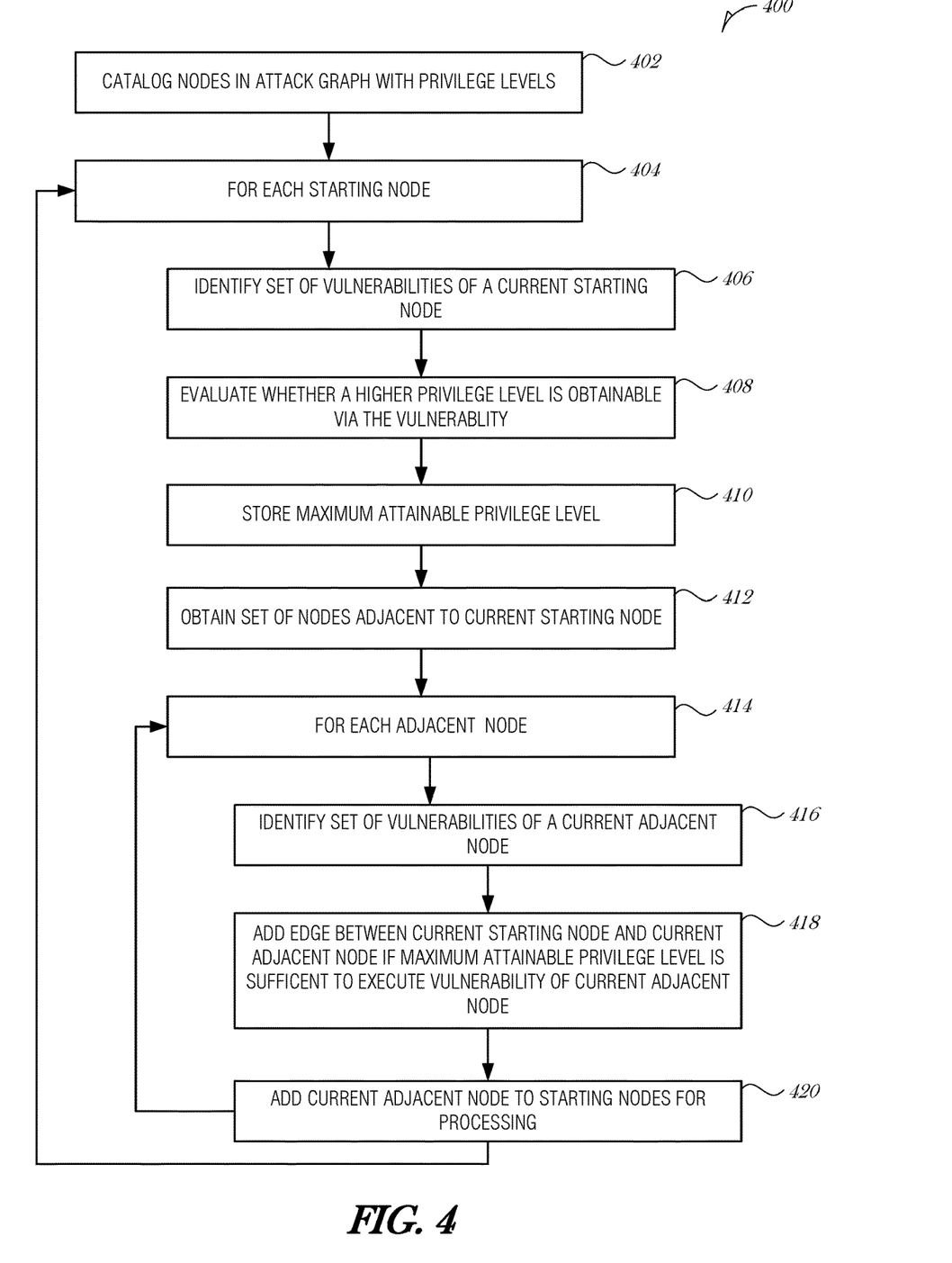
FIG. 4 is a flowchart illustrating a method for generating an attack graph, according to an embodiment.

FIG. 4 illustrates a method for generating an attack graph, according to an embodiment. At 402, the nodes in an attack graph are cataloged with each node having a privilege level. The privilege level of the node is the privilege level of a user of the node. Privilege levels typically include administrative privileges, user privileges, and no privileges (e.g., unprotected).

At 404, for each start node where an attack may start from, a set of vulnerabilities is obtained for the current start node (operation 406), and for each of the vulnerabilities it is evaluated which privilege level is obtainable by way of the vulnerabilities (operation 408). At operation 410, the maximum privilege level is stored during the vulnerability analysis (operations 406-408).

At 412, the set of adjacent nodes that are adjacent to the current start node is obtained. At 414, for each of the adjacent nodes, a set of vulnerabilities of the current adjacent node is obtained (416) and if there is an attack vector (e.g., a way to attack the current adjacent node from the current start node) and the privilege level is sufficient (e.g., privilege level is higher than needed to effect the vulnerability or there is no privilege needed to effect the vulnerability), then the edge between the current start node and the current adjacent node is added to the attack path (operation 418) and the current adjacent node is added to a list of start nodes (operation 420). By adding the current adjacent node to the list of start nodes, operations 404-406 are executed on the newly added current adjacent node (to iterate and create a longer attack path). After the operations of 404-420 complete, the edges of attack paths are stored and connected paths through nodes can be assembled.

Figure 5:
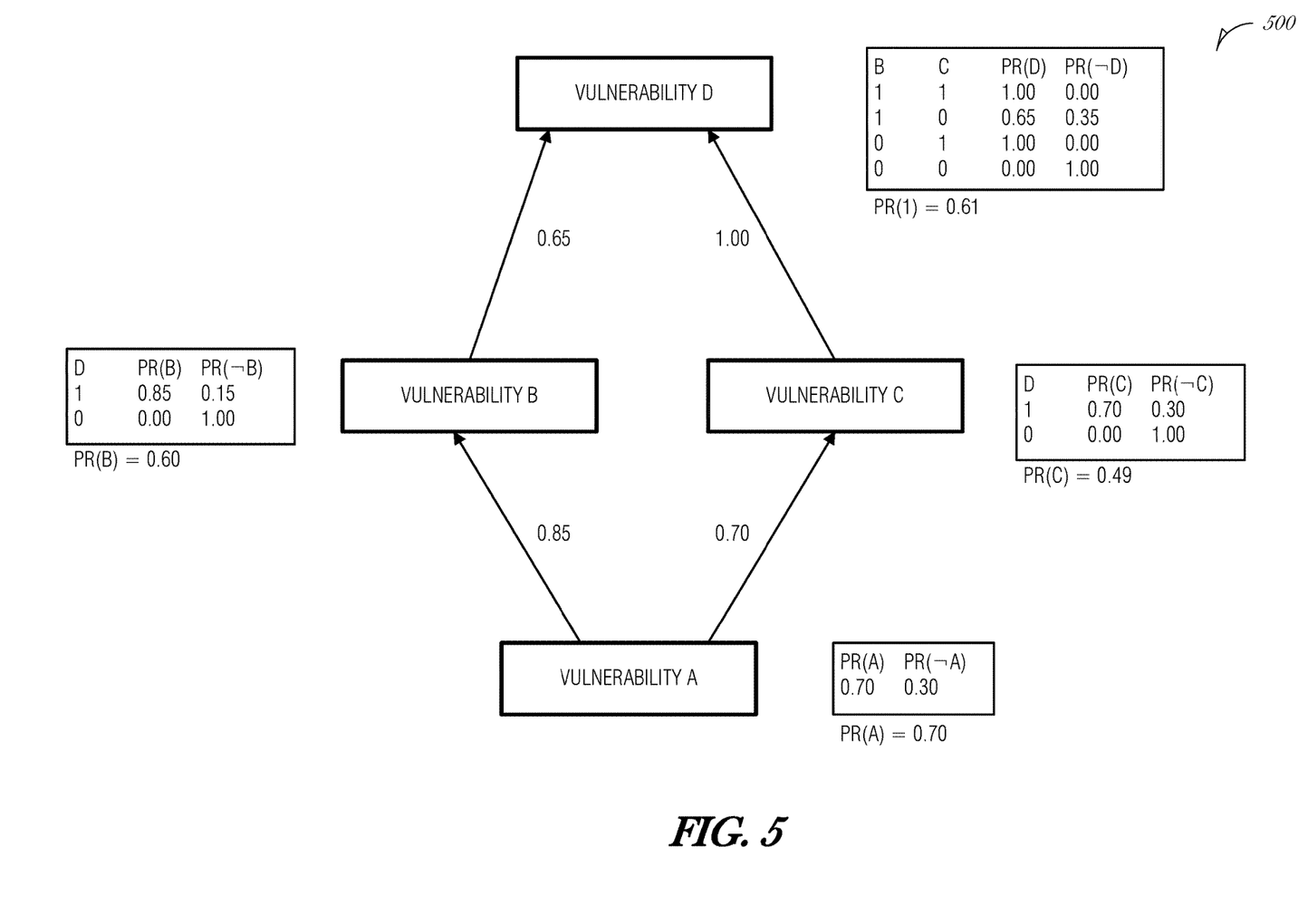
FIG. 5 is a diagram illustrating an example Bayesian attack graph, according to an embodiment.

Returning to FIG. 1, in stage 130, the attack paths are evaluated to determine the risk of them being exploited. A Bayes Network may be used to calculate the conditional probability distributions for vulnerability exploits. The probabilities of a vulnerability being exploited may be adjusted based on a CVSS score. CVSS refers to the Common Vulnerability Scoring System provided by NIST and OSINT. There are multiple versions including version 2 and version 3 of the CVSS score. In general, a CVSS score expresses the severity of software vulnerabilities. CVSS measures the severity, not risk (i.e., probability of occurrence), of a vulnerability. As such, when combined with a Bayes Network, which evaluates the risk of any vulnerability or chain of vulnerabilities as conditional probability distributions, CVSS may be used as an influence to the perceived overall risk. FIG. 5 is a diagram illustrating an example Bayesian attack graph 500, according to an embodiment. The Bayesian attack graph 500 includes local conditional probability tables (CPT) for each of the vulnerability nodes (distributions as illustrated in the tables). The Bayesian attack graph 500 also includes the probability that a vulnerability will be exploited expressed on the edge. An edge is a directed arc that represents the conditional dependency between a pair of nodes. The edge represents the causal relationship between the two nodes, thus exploitation of one vulnerability influences another vulnerability. So, for example, there is an 85% chance that Vulnerability B will be exploited given Vulnerability A is exploited, and there is a 65% chance that Vulnerability C will be exploited if both Vulnerability A and B are exploited.

The Conditional Probability Tables (CPT) can be considered as logical AND or functions. In the first case, all the preconditions must be satisfied to compromise the node. In contrast, the OR function, at least one precondition must be satisfied. Due to the nature of the precondition selected, privilege, we can select the OR function to represent the values for the CPT.

We will consider that each node of the graph is a Bernoulli Random Variable, Vi. This assumption will give us the following Probability:

$$P(V_i=1)=p, P(V_i=0)=1-p;$$

where 'p' represents the probability of exploitation.

The choice of the OR operator, for modeling the conditions, lead to the Probability equation:

$$P(V_i \mid pa_j) = \begin{cases} 1, \text{ for any } v_j \text{ that belongs to } pa_j \text{ where } V_j = \text{False} \\ 1-(1-l)\prod_{V_j \text{ is True}}(1-p_j) \end{cases}$$

where $V_j$—set of all parent nodes of $V_i$, $p_j$—probability of exploit value for $V_j$ that belongs to $pa_j$, and $l$—leak factor that models the non-perfect behavior of the alert system or the presence of a zero-day vulnerability.

After the CPT is calculated for each node, the joint probability of the attack sequence to be exploited can be calculated by using the Chain Rule. For instance, using the vulnerabilities A, B, C, and D from FIG. 5, the Chain Rule dictates:

$$P(Vd, Vc, Vb, Va) = \Pi P(Vd \mid Vc, Vb, Va)$$

The equation above represents the probability that all vulnerabilities of attack chain A-B-C-D will be exploited to compromise a host/machine.

In stage 140, a remediation strategy is developed based on the risk of each of the attack paths. In an implementation, remediation may be prioritized based on the probability (i.e., risk) or an attack path (e.g., a vulnerability being exploited). The risk scores that are calculated in the previous stage may be used to sort the various attack paths. Those that have higher risk scores may be addressed first and their remediation prioritized.

Remediation may also be sorted based on which remediation delivers the greatest reduction in the likelihood of a vulnerability chain being exploited. Due to the structure of the Attack Path and graph network, a max-flow min-cut optimization theory may be used to determine a solution. The max-flow min-cut theorem states that in a flow network (e.g., attack graph), the maximum amount of flow (i.e., likelihood) passing from the source (start of the attack) to the sink (end of the attack) is equal to the total weight of the edges in a minimum cut, i.e. the smallest total weight of the edges which if removed would disconnect the source from the sink. This disconnect represents the reduction of the identified Risk Score to 0.

The theory has been solved with the Ford-Fulkerson Algorithm. The output of the algorithm represents the minimum number of edges that need to be removed, with the highest probability of exploitation, so that a disconnect exists from sink to source. The parent of the edges represents the vulnerabilities that need to be remediated.

The assumption of the model at this step is that the weight of the edge is selected as being the highest probability of exploitation given the fact that the past vulnerabilities are exploited. Thus, identifying the edges with the highest weight leads to the identification of vulnerabilities that drive the greatest reduction in the risk score. From the set of vulnerabilities identified as candidates for remediation, we need to identify the order of remediation that drives the greatest reduction of risk.

At this step, for vulnerability from the candidate set, we are treating a remediation of a given vulnerability as new information about that node. Thus, the Bayes Network a way to update the probability distributions over the possible value of each node in the Attack Graph. After the probability distributions are updated, the Chain Rule is used to calculate the new likelihood:

$$P(Vd,Vc,Vb,Va)=\Pi P(Vd|Vc,Vb,Va)$$

Based on these observations, the Ford-Fulkerson Algorithm can identify the sequence of vulnerabilities to be remediated that deliver the greatest reduction in the likelihood of the vulnerability chain being exploited.

Figure 6:
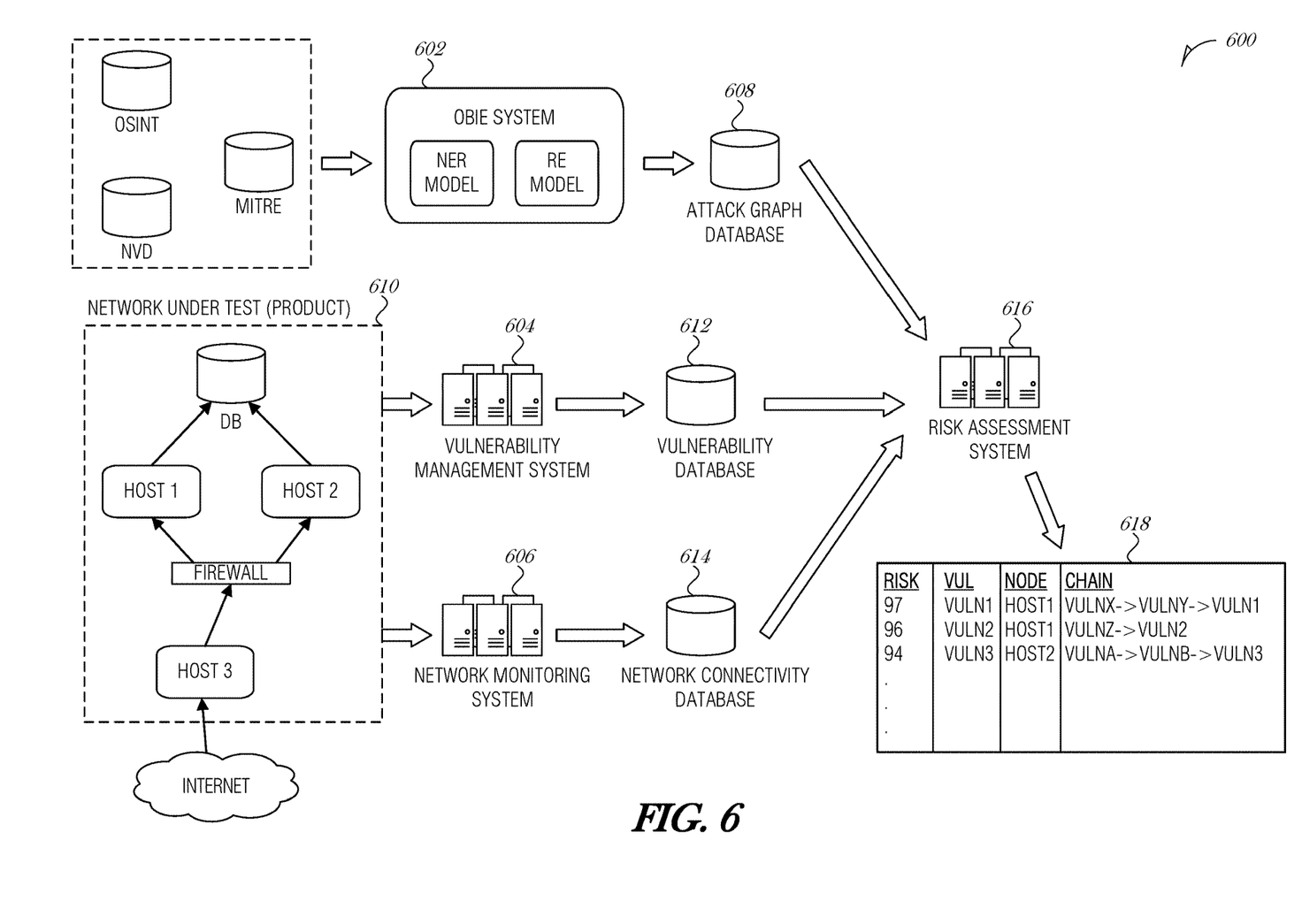
FIG. 6 is a diagram illustrating a risk-based vulnerability management system, according to an embodiment.

FIG. 6 is a diagram illustrating a risk-based vulnerability management system 600, according to an embodiment. The system 600 includes an OBIE system 602, a vulnerability management system 604, and a network monitoring system 606. It is understood that the OBIE system 602, vulnerability management system 604, and network monitoring system 606 may be hosted on the same computing system, be integrated into a common platform or product, or be provided by the same service provider. Alternatively, one or more of the OBIE system 602, vulnerability management system 604, and network monitoring system 606 may be independent products, computing systems, platforms, or services.

The OBIE system 602 may be hosted by a third party. In an embodiment, the OBIE system 602 is provided by Knowledge Studio service of IBM Watson. Alternatively, the OBIE system 602 may be hosted using local resources. The OBIE system 602 is provided exploit data from various electronic sources, such as OSINT databases, the MITRE ATT&CK® knowledge base, the NVD, or data sources provided by the Cybersecurity & Infrastructure Security Agency. The NER and RE models in the OBIE system 602 are used to classify tokens according to the custom ontology. The classified tokens are stored in an attack graph database 608.

The vulnerability management system 604 may be a part of a broader software platform. The vulnerability management system 604 may be retail software platforms, such as Veracode, Prisma Cloud by Palo Alto Networks, or Rapid7. The vulnerability management system 604 is used to collect data from components in a network under test 610. The data may provide information about current software versions, firmware, driver software, port settings, permissions, configurations, and the like installed or existent on hosts, network appliances, or other components in the network under test 610. The potential vulnerabilities are stored in a vulnerability database 612.

The network monitoring system 606 is used to collect the topology, connectivity, and other settings or configurations about the network under test 610. This data is stored in a network connectivity database 614.

A risk assessment system 616 is used to determine a risk score for vulnerabilities identified in the vulnerability database 612. The attack graph database 608 stores all of the known attacks in a complete graph. Attack paths in the attack graph database 608 are identified using the vulnerabilities that exist in the vulnerability database 612 and the network configuration stored in the network connectivity database 614. The risk score is based on which vulnerabilities are likely to be exploited and the severity of such vulnerabilities.

In an embodiment, the risk score is based on the conditional probability tables (CPT) for each vulnerability (such as illustrated in FIG. 5). In an embodiment, the risk score is defined as:

$$Risk=Impact*Likelihood$$

For estimating impact, the methodology relies on Asset Management definitions of the system under evaluation. Impact can be defined with a numerical value, e.g. [0-100], based on different attributes of the system, e.g. Data Classification, thus making it possible to calculate the risk score for a given attack chain. Likelihood is based on the joint probability of the attack sequence being exploited calculated by using the Chain Rule.

An example risk score output 618 is illustrated in FIG. 6. The risk scores are normalized to range, such as 1-100. The risk scores may be presented to a user in a descending order to highlight the vulnerabilities that pose the highest risk. The risk score output 618 include four components: 1) the risk score, 2) the vulnerability, 3) the network node that includes the vulnerability, and 4) the chain of attack. The chain of attack may include multiple vulnerabilities, which when exploited in succession, conclude with the vulnerability listed in the second component. The vulnerabilities may be labeled with the identifiers, such as a MITRE ATT&CK® group ID, a CVE identifier, or the like. This provides a human administrator quick access to relevant information about vulnerabilities identified by the risk assessment system 616. It is understood that other information may be provided in the risk score output 618 or related user interfaces, such as mitigation techniques, hyperlinks to vulnerability databases, links to installation files for cleaning tools, or the like. Additionally, it is understood that the risk score output 618 may be used by other systems to drive processes, such as alerts, self-healing processes, quarantine procedures, system reboots, or the like that are executed wholly by electronic systems.

Figure 7:
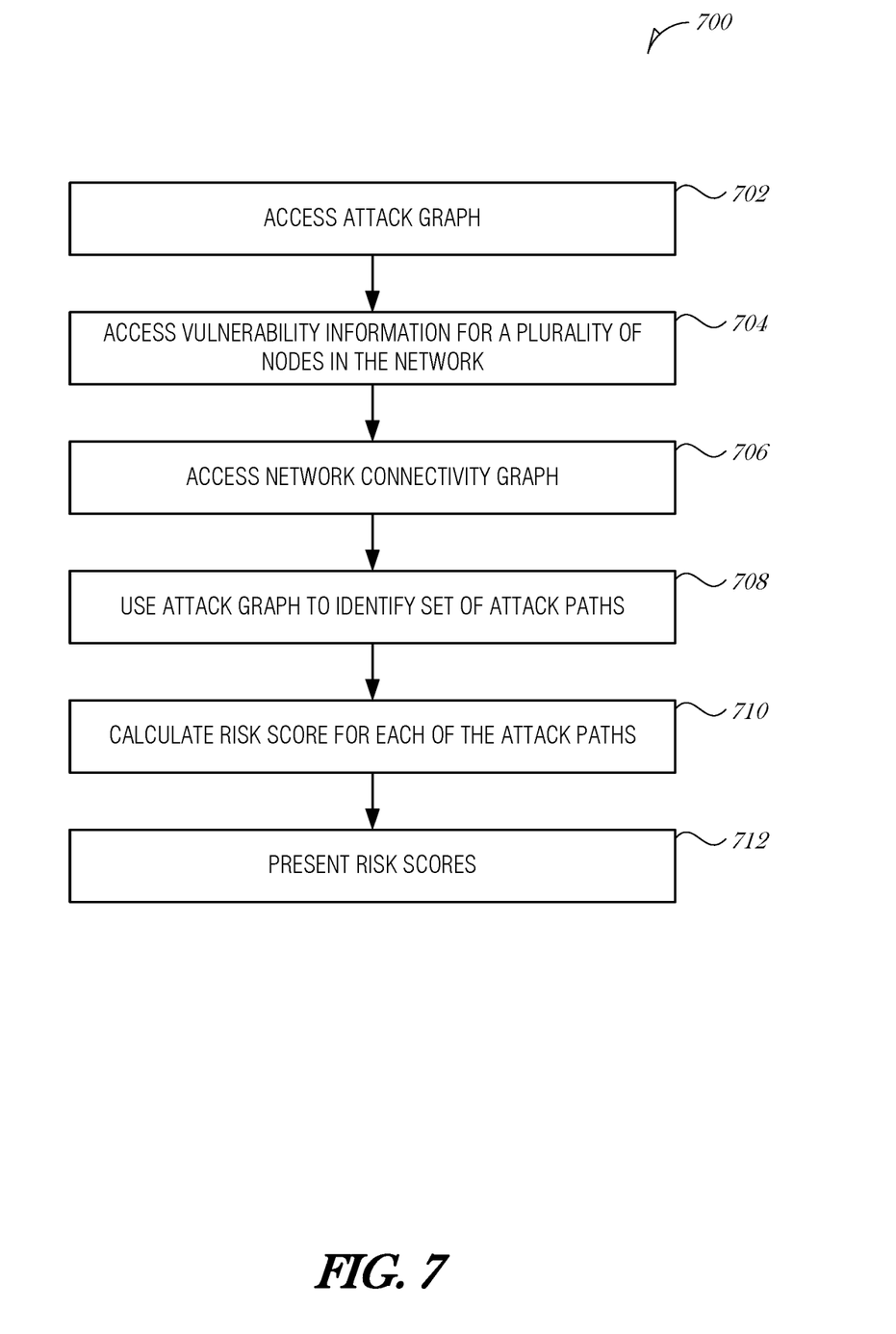
FIG. 7 is a flowchart illustrating a method for evaluating vulnerability risk in a network, according to an embodiment.

FIG. 7 is a flowchart illustrating a method 700 for evaluating vulnerability risk in a network, according to an embodiment. The method 700 may be performed by processing logic that can include hardware (e.g., processing device, circuitry, dedicated logic, programmable logic, microcode, hardware of a device, integrated circuit, etc.). In some embodiments, the method 700 is performed by the computer system 800 of FIG. 8.

At 702, an attack graph is accessed, where the attack graph includes exploits represented as preconditions and postconditions. In an embodiment, the attack graph is developed using a natural language processing (NLP) engine. In a further embodiment, the NLP engine labels preconditions and postconditions of an exploit. In a further embodiment, the exploit is accessed from a public vulnerability database. In another embodiment, the NLP engine is trained using an ontology. In a related embodiment, the ontology creates classes of preconditions and postconditions based on relationships between vulnerabilities, attack privilege, and network connectivity.

At 704, vulnerability information of a plurality of nodes in the network is accessed, the vulnerability information including conditions of the plurality of nodes in the network. In an embodiment, the plurality of nodes includes a host. In a related embodiment, the plurality of nodes includes a network appliance. In a related embodiment, the plurality of nodes includes a router. In a related embodiment, the plurality of nodes includes a firewall.

At 706, a network connectivity graph that represents a logical network topology of the plurality of nodes in the network is accessed.

At 708, a set of attack paths is identified in the attack graph by comparing the conditions of the plurality of nodes in the network with preconditions and postconditions in the attack graph. In an embodiment, identifying the set of attack paths in the attack graph includes 1) evaluating a current node in the attack graph to identify vulnerability information; 2) evaluating the vulnerability information to calculate a maximum privilege level obtainable by an attacker at the current node based on a default privilege level of the attacker or an enhanced privilege level of the attacker after using a vulnerability according to the vulnerability information; 3) identifying adjacent nodes to the node, wherein an adjacent node is connected either logically or physically to the node; 4) evaluating each adjacent node to determine a set of vulnerabilities for each adjacent node; 5) evaluating each set of vulnerabilities for each adjacent node to determine if the maximum privilege level is sufficient to execute a vulnerability of the set of vulnerabilities; and 6) adding an edge between the current node and the adjacent node to the set of attack paths.

At 710, a risk score for each of the set of attack paths in the attack graph is calculated. In an embodiment, calculating the risk score for each of the set of attack paths in the attack graph, includes calculating a joint probability of an attack sequence defined by a chain of preconditions and postconditions in the attack graph.

At 712, the risk score for each of the set of attack paths is presented. In an embodiment, presenting the risk score for each of the set of attack paths, includes presenting a chain of attack that illustrates the corresponding attack path.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
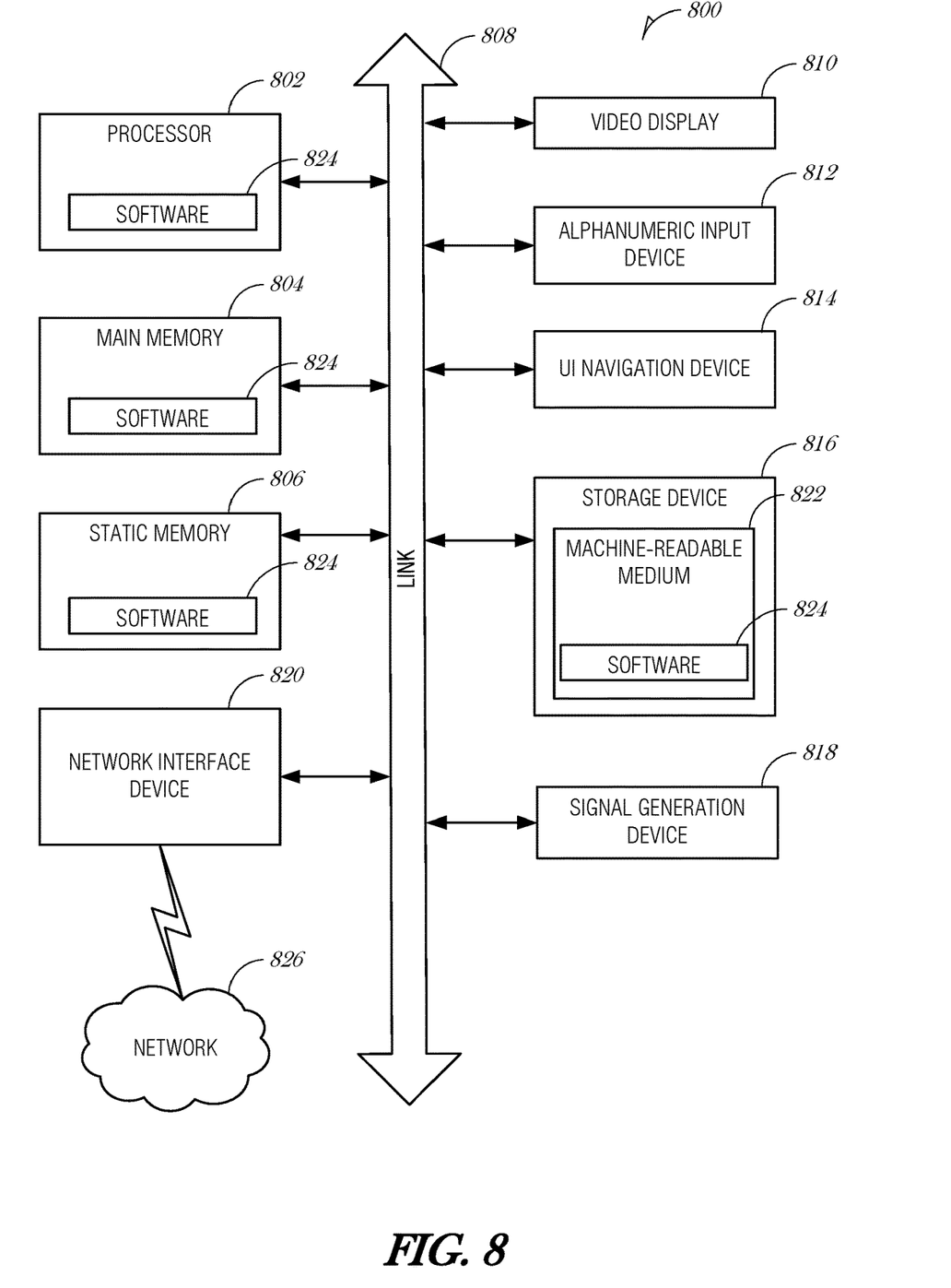
FIG. 8 is a block diagram illustrating an example machine upon which any one or more of the techniques (e.g., methodologies) discussed herein may perform, according to an embodiment.

FIG. 8 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In an embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Additional Notes & Examples

Example 1 is a system, comprising: a processor; and memory to store instructions for evaluating vulnerability risk in a network, which when executed by the processor, cause the system to: access an attack graph, the attack graph including exploits represented as preconditions and postconditions; access vulnerability information of a plurality of nodes in the network, the vulnerability information including conditions of the plurality of nodes in the network; access a network connectivity graph that represents a logical network topology of the plurality of nodes in the network; identify a set of attack paths in the attack graph by comparing the conditions of the plurality of nodes in the network with preconditions and postconditions in the attack graph; calculate a risk score for each of the set of attack paths in the attack graph; and present the risk score for each of the set of attack paths.

In Example 2, the subject matter of Example 1 includes, wherein the plurality of nodes includes a host.

In Example 3, the subject matter of Examples 1-2 includes, wherein the plurality of nodes includes a network appliance.

In Example 4, the subject matter of Examples 1-3 includes, wherein the plurality of nodes includes a router.

In Example 5, the subject matter of Examples 1-4 includes, wherein the plurality of nodes includes a firewall.

In Example 6, the subject matter of Examples 1-5 includes, wherein the attack graph is developed using a natural language processing (NLP) engine.

In Example 7, the subject matter of Example 6 includes, wherein the NLP engine labels preconditions and postconditions of an exploit.

In Example 8, the subject matter of Example 7 includes, wherein the exploit is accessed from a public vulnerability database.

In Example 9, the subject matter of Examples 7-8 includes, wherein the NLP engine is trained using an ontology.

In Example 10, the subject matter of Example 9 includes, wherein the ontology creates classes of preconditions and postconditions based on relationships between vulnerabilities, attack privilege, and network connectivity.

In Example 11, the subject matter of Examples 1-10 includes, wherein to identify the set of attack paths in the attack graph, the processor is to: evaluate a current node in the attack graph to identify vulnerability information; evaluate the vulnerability information to calculate a maximum privilege level obtainable by an attacker at the current node based on a default privilege level of the attacker or an enhanced privilege level of the attacker after using a vulnerability according to the vulnerability information; identify adjacent nodes to the node, wherein an adjacent node is connected either logically or physically to the node; evaluate each adjacent node to determine a set of vulnerabilities for each adjacent node; evaluate each set of vulnerabilities for each adjacent node to determine if the maximum privilege level is sufficient to execute a vulnerability of the set of vulnerabilities; and add an edge between the current node and the adjacent node to the set of attack paths.

In Example 12, the subject matter of Examples 1-11 includes, wherein to calculate the risk score for each of the set of attack paths in the attack graph, the processor is to calculate a joint probability of an attack sequence defined by a chain of preconditions and postconditions in the attack graph.

In Example 13, the subject matter of Examples 1-12 includes, wherein to present the risk score for each of the set of attack paths, the processor is to present a chain of attack that illustrates the corresponding attack path.

Example 14 is a method for evaluating vulnerability risk in a network, comprising: accessing an attack graph, the attack graph including exploits represented as preconditions and postconditions; accessing a vulnerability information of a plurality of nodes in the network, the vulnerability information including conditions of the plurality of nodes in the network; accessing a network connectivity graph that represents a logical network topology of the plurality of nodes in the network; identifying a set of attack paths in the attack graph by comparing the conditions of the plurality of nodes in the network with preconditions and postconditions in the attack graph; calculating a risk score for each of the set of attack paths in the attack graph; and presenting the risk score for each of the set of attack paths.

In Example 15, the subject matter of Example 14 includes, wherein the plurality of nodes includes a host.

In Example 16, the subject matter of Examples 14-15 includes, wherein the plurality of nodes includes a network appliance.

In Example 17, the subject matter of Examples 14-16 includes, wherein the plurality of nodes includes a router.

In Example 18, the subject matter of Examples 14-17 includes, wherein the plurality of nodes includes a firewall.

In Example 19, the subject matter of Examples 14-18 includes, wherein the attack graph is developed using a natural language processing (NLP) engine.

In Example 20, the subject matter of Example 19 includes, wherein the NLP engine labels preconditions and postconditions of an exploit.

In Example 21, the subject matter of Example 20 includes, wherein the exploit is accessed from a public vulnerability database.

In Example 22, the subject matter of Examples 20-21 includes, wherein the NLP engine is trained using an ontology.

In Example 23, the subject matter of Example 22 includes, wherein the ontology creates classes of preconditions and postconditions based on relationships between vulnerabilities, attack privilege, and network connectivity.

In Example 24, the subject matter of Examples 14-23 includes, wherein identifying the set of attack paths in the attack graph comprises: evaluating a current node in the attack graph to identify vulnerability information; evaluating the vulnerability information to calculate a maximum privilege level obtainable by an attacker at the current node based on a default privilege level of the attacker or an enhanced privilege level of the attacker after using a vulnerability according to the vulnerability information; identifying adjacent nodes to the node, wherein an adjacent node is connected either logically or physically to the node; evaluating each adjacent node to determine a set of vulnerabilities for each adjacent node; evaluating each set of vulnerabilities for each adjacent node to determine if the maximum privilege level is sufficient to execute a vulnerability of the set of vulnerabilities; and adding an edge between the current node and the adjacent node to the set of attack paths.

In Example 25, the subject matter of Examples 14-24 includes, wherein calculating the risk score for each of the set of attack paths in the attack graph, comprises calculating a joint probability of an attack sequence defined by a chain of preconditions and postconditions in the attack graph.

In Example 26, the subject matter of Examples 14-25 includes, wherein presenting the risk score for each of the set of attack paths, comprises presenting a chain of attack that illustrates the corresponding attack path.

Example 27 is at least one machine-readable medium including instructions for evaluating vulnerability risk in a network, which when executed by a machine, cause the machine to: access an attack graph, the attack graph including exploits represented as preconditions and postconditions; access vulnerability information of a plurality of nodes in the network, the vulnerability information including conditions of the plurality of nodes in the network; access a network connectivity graph that represents a logical network topology of the plurality of nodes in the network; identify a set of attack paths in the attack graph by comparing the conditions of the plurality of nodes in the network with preconditions and postconditions in the attack graph; calculate a risk score for each of the set of attack paths in the attack graph; and present the risk score for each of the set of attack paths.

In Example 28, the subject matter of Example 27 includes, wherein the plurality of nodes includes a host.

In Example 29, the subject matter of Examples 27-28 includes, wherein the plurality of nodes includes a network appliance.

In Example 30, the subject matter of Examples 27-29 includes, wherein the plurality of nodes includes a router.

In Example 31, the subject matter of Examples 27-30 includes, wherein the plurality of nodes includes a firewall.

In Example 32, the subject matter of Examples 27-31 includes, wherein the attack graph is developed using a natural language processing (NLP) engine.

In Example 33, the subject matter of Example 32 includes, wherein the NLP engine labels preconditions and postconditions of an exploit.

In Example 34, the subject matter of Example 33 includes, wherein the exploit is accessed from a public vulnerability database.

In Example 35, the subject matter of Examples 33-34 includes, wherein the NLP engine is trained using an ontology.

In Example 36, the subject matter of Example 35 includes, wherein the ontology creates classes of preconditions and postconditions based on relationships between vulnerabilities, attack privilege, and network connectivity.

In Example 37, the subject matter of Examples 27-36 includes, wherein to identify the set of attack paths in the attack graph, the instructions cause the machine to: evaluate a current node in the attack graph to identify vulnerability information; evaluate the vulnerability information to calculate a maximum privilege level obtainable by an attacker at the current node based on a default privilege level of the attacker or an enhanced privilege level of the attacker after using a vulnerability according to the vulnerability information; identify adjacent nodes to the node, wherein an adjacent node is connected either logically or physically to the node; evaluate each adjacent node to determine a set of vulnerabilities for each adjacent node; evaluate each set of vulnerabilities for each adjacent node to determine if the maximum privilege level is sufficient to execute a vulnerability of the set of vulnerabilities; and add an edge between the current node and the adjacent node to the set of attack paths.

In Example 38, the subject matter of Examples 27-37 includes, wherein to calculate the risk score for each of the set of attack paths in the attack graph, the instructions cause the machine to calculate a joint probability of an attack sequence defined by a chain of preconditions and postconditions in the attack graph.

In Example 39, the subject matter of Examples 27-38 includes, wherein to present the risk score for each of the set of attack paths, the instructions cause the machine to present a chain of attack that illustrates the corresponding attack path.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system, comprising:
   a processor; and
   memory to store instructions for evaluating vulnerability risk in a network, which when executed by the processor, cause the system to:
   access an attack graph developed using a natural language processing (NLP) engine trained with an ontology that creates classes of preconditions and postconditions based on relationships between vulnerabilities, attack privilege, and network connectivity, wherein the attack graph includes exploits represented as preconditions and postconditions;
   access vulnerability information of a plurality of nodes in the network, the vulnerability information including conditions of the plurality of nodes in the network;
   access a network connectivity graph that represents a logical network topology of the plurality of nodes in the network;
   identify a set of attack paths in the attack graph by comparing the conditions of the plurality of nodes in the network with preconditions and postconditions in the attack graph;
   calculate a risk score for each of the set of attack paths in the attack graph by calculating a joint probability of an attack sequence defined by a chain of preconditions and postconditions in the attack graph; and
   present the risk score for each of the set of attack paths.

2. The system of claim 1, wherein the plurality of nodes includes a host.

3. The system of claim 1, wherein the plurality of nodes includes a network appliance.

4. The system of claim 1, wherein the plurality of nodes includes a router.

5. The system of claim 1, wherein the plurality of nodes includes a firewall.

6. The system of claim 1, wherein the NLP engine labels preconditions and postconditions of an exploit.

7. The system of claim 6, wherein the exploit is accessed from a public vulnerability database.

8. The system of claim 6, wherein the NLP engine is trained using an ontology, wherein the ontology is developed by:
   training a Named Entity Recognition (NER) model and a Relation Extraction (RE) model using annotated data that defines relationships between vulnerabilities, attack privilege, and network connectivity;
   using the trained NER model to classify tokens extracted from vulnerability data sources as vulnerability attributes, attack privilege attributes, or network connectivity attributes; and
   using the trained RE model to identify relationships between the classified tokens to determine preconditions and postconditions of exploits.

9. The system of claim 8, wherein the ontology creates classes of preconditions and postconditions based on relationships between vulnerabilities, attack privilege, and network connectivity.

10. The system of claim 1, wherein to identify the set of attack paths in the attack graph, the processor is to:
    evaluate a current node in the attack graph to identify vulnerability information;
    evaluate the vulnerability information to calculate a maximum privilege level obtainable by an attacker at the current node based on a default privilege level of the attacker or an enhanced privilege level of the attacker after using a vulnerability according to the vulnerability information;
    identify adjacent nodes to the current node, wherein an adjacent node is connected either logically or physically to the current node;
    evaluate each adjacent node to determine a set of vulnerabilities for each adjacent node;
    evaluate each set of vulnerabilities for each adjacent node to determine if the maximum privilege level is sufficient to execute a vulnerability of the set of vulnerabilities; and
    add an edge between the current node and the adjacent node to the set of attack paths.

11. The system of claim 1, wherein to present the risk score for each of the set of attack paths, the processor is to present a chain of attack that illustrates the corresponding attack path.

12. A method for evaluating vulnerability risk in a network, comprising:
    accessing an attack graph developed using a natural language processing (NLP) engine trained with an ontology that creates classes of preconditions and postconditions based on relationships between vulnerabilities, attack privilege, and network connectivity, wherein the attack graph includes exploits represented as preconditions and postconditions;
    accessing a vulnerability information of a plurality of nodes in the network, the vulnerability information including conditions of the plurality of nodes in the network;
    accessing a network connectivity graph that represents a logical network topology of the plurality of nodes in the network;
    identifying a set of attack paths in the attack graph by comparing the conditions of the plurality of nodes in the network with preconditions and postconditions in the attack graph;
    calculating a risk score for each of the set of attack paths in the attack graph by calculating a joint probability of an attack sequence defined by a chain of preconditions and postconditions in the attack graph; and
    presenting the risk score for each of the set of attack paths.

13. The method of claim 12, wherein the plurality of nodes includes a host.

14. The method of claim 12, wherein the plurality of nodes includes a network appliance.

15. The method of claim 12, wherein the plurality of nodes includes a router.

16. The method of claim 12, wherein the plurality of nodes includes a firewall.

17. The method of claim 12, wherein the NLP engine labels preconditions and postconditions of an exploit.

18. The method of claim 17, wherein the exploit is accessed from a public vulnerability database.

19. The method of claim 17, wherein the NLP engine is trained using an ontology, wherein the ontology is developed by:
- training a Named Entity Recognition (NER) model and a Relation Extraction (RE) model using annotated data that defines relationships between vulnerabilities, attack privilege, and network connectivity;
- using the trained NER model to classify tokens extracted from vulnerability data sources as vulnerability attributes, attack privilege attributes, or network connectivity attributes; and
- using the trained RE model to identify relationships between the classified tokens to determine preconditions and postconditions of exploits.

20. The method of claim 19, wherein the ontology creates classes of preconditions and postconditions based on relationships between vulnerabilities, attack privilege, and network connectivity.

21. The method of claim 12, wherein identifying the set of attack paths in the attack graph comprises:
- evaluating a current node in the attack graph to identify vulnerability information;
- evaluating the vulnerability information to calculate a maximum privilege level obtainable by an attacker at the current node based on a default privilege level of the attacker or an enhanced privilege level of the attacker after using a vulnerability according to the vulnerability information;
- identifying adjacent nodes to the current node, wherein an adjacent node is connected either logically or physically to the current node;
- evaluating each adjacent node to determine a set of vulnerabilities for each adjacent node;
- evaluating each set of vulnerabilities for each adjacent node to determine if the maximum privilege level is sufficient to execute a vulnerability of the set of vulnerabilities; and
- adding an edge between the current node and the adjacent node to the set of attack paths.

22. At least one non-transitory machine-readable medium including instructions for evaluating vulnerability risk in a network, which when executed by a machine, cause the machine to:
- access an attack graph developed using a natural language processing (NLP) engine trained with an ontology that creates classes of preconditions and postconditions based on relationships between vulnerabilities, attack privilege, and network connectivity, wherein the attack graph includes exploits represented as preconditions and postconditions;
- access vulnerability information of a plurality of nodes in the network, the vulnerability information including conditions of the plurality of nodes in the network;
- access a network connectivity graph that represents a logical network topology of the plurality of nodes in the network;
- identify a set of attack paths in the attack graph by comparing the conditions of the plurality of nodes in the network with preconditions and postconditions in the attack graph;
- calculate a risk score for each of the set of attack paths in the attack graph by calculating a joint probability of an attack sequence defined by a chain of preconditions and postconditions in the attack graph; and
- present the risk score for each of the set of attack paths.

\* \* \* \* \*